United States Patent Office 2,779,778
Patented Jan. 29, 1957

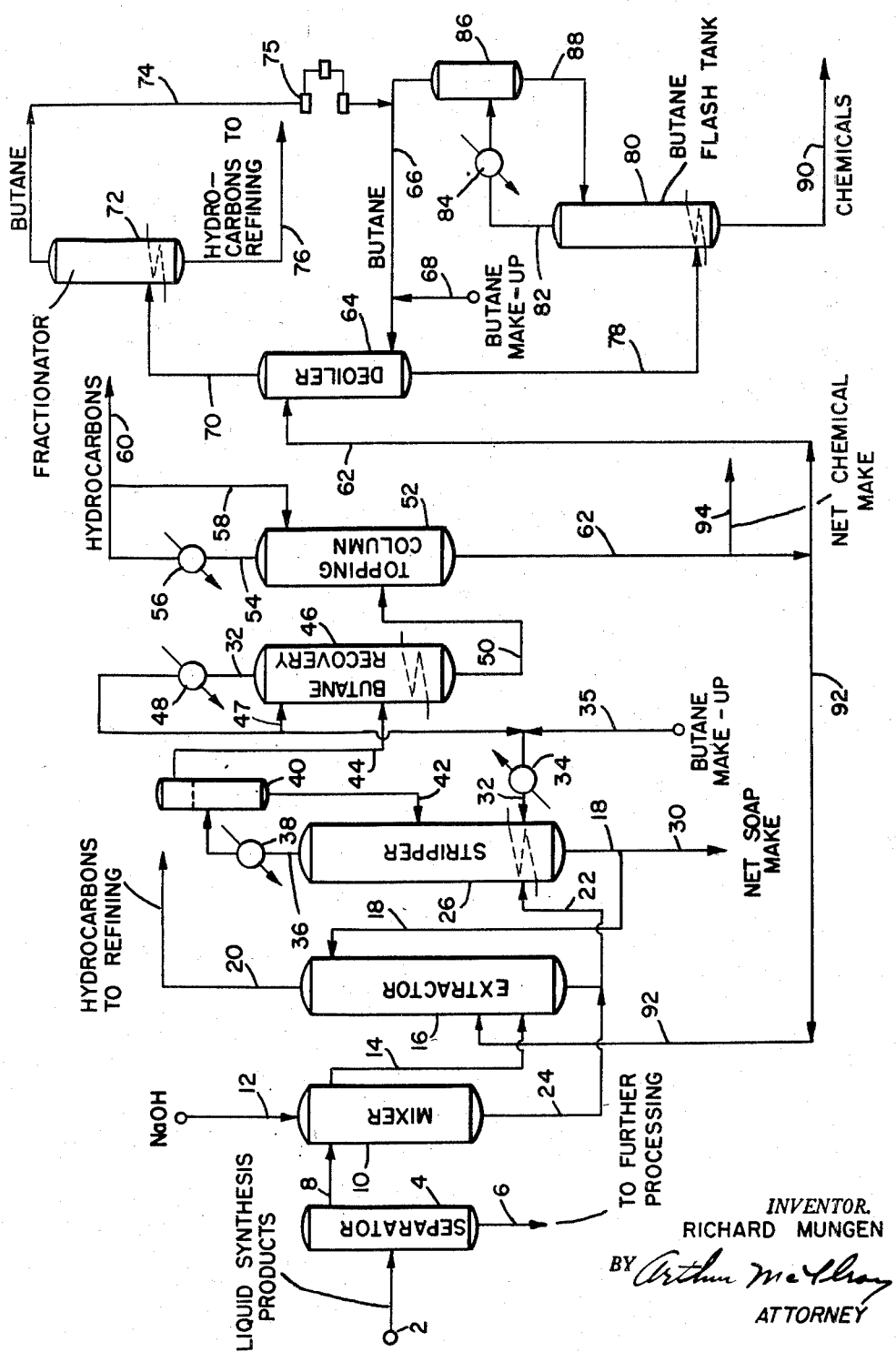

2,779,778

PROCESS FOR SEPARATING VOLATILE COMPONENTS FROM LIQUID MIXTURES

Richard Mungen, Tulsa, Okla., assignor to Stanolind Oil and Gas Company, Tulsa, Okla., a corporation of Delaware Application August 29, 1952, Serial No. 307,079

7 Claims. (Cl. 260—450)

The present invention relates to a novel method for separating a volatile component from nonvolatile components present in mixtures thereof. More particularly, it pertains to a process for removing said volatile component at temperature conditions which may be substantially below the boiling point of any of the constituents of said mixtures.

While the principles taught herein find application in the recovery of volatile components from a wide variety of mixtures, the present description deals particularly with the problems encountered in recovering valuable chemicals from the oil stream produced by the hydrogenation of carbon monoxide in the presence of a fluidized alkali promoted catalyst under known synthesis conditions. This oil fraction obtained in the hydrocarbon synthesis process contains a rather wide variety of acids, carbonyl compounds (ketones and aldehydes), and alcohols together with a smaller proportion of esters. For example, in hydrocarbon synthesis plants designed to produce approximately 650,000 lbs. per day of liquid hydrocarbons, there are simultaneously produced along with this oil fraction about 76,000 lbs. of oil-soluble carbonyl compounds, about 61,700 lbs. of oil-soluble alcohols, and about 69,300 lbs. of oil-soluble acids. Because of their value as chemicals, it is desirable to separate these compounds from the oil stream as completely as possible. Also in the subsequent conversion of the aforesaid oil fraction into gasoline, it is imperative that such compounds either be removed from the oil or converted into substances such as, for example, unsaturated hydrocarbons, which can then be utilized in conjunction with the hydrocarbons originally synthesized to make high quality motor fuels.

Because of the close proximity in boiling points of these various oil-soluble chemicals to the hydrocarbons constituting the oil fraction, separation of chemicals from hydrocarbons by normal fractional distillation methods is a practical impossibility. Normally, in the recovery of chemicals from the oil stream, the raw primary synthesis oil, as it comes from the separating unit, is treated with sufficient caustic to neutralize the acids present. There result two layers, a neutral oil layer containing the bulk of the nonacid oil-soluble chemicals and a lower aqueous layer containing the acids in the form of their corresponding salts together with an appreciable percentage, i. e., approximately 25 weight percent of nonacid chemicals which have been solubilized thereby and from about 10 to 20 weight percent of hydrocarbons, depending, of course, on the strength of the caustic solution initially added. While recovery of the acids from the aforesaid aqueous layer can be accomplished without substantial difficulty, the solubilized chemicals and hydrocarbons present a difficult problem, especially where it is desired to effect a substantially complete separation of chemicals from hydrocarbons. Further extraction of the neutral oil layer with salt solutions formerly used, i. e., high molecular weight salts or solutions of salts derived from neutralizing the entire acid component of the hydrocarbon synthesis oil, failed to result in satisfactory separation of chemicals from the oil. Thus, when extract solutions of these salts, i. e., chemically rich salt solutions obtained by extracting the neutral hydrocarbon synthesis oil with a lean salt solution, were subjected to a stripping operation to separate the dissolved chemicals from the salt solution, foaming within the column frequently became so excessive that further separation of the chemicals from the extract was either impossible or the capacity of the stripping column was seriously limited. This foaming is largely caused by the fact that in conventional procedures the rich salt solution, introduced near the top of the column, is diluted as it flows downwardly and is mixed with an aqueous reflux stream which is also introduced at a point near the top of the column. As a result the diluted soap cannot be stripped at an economical rate without causing excessive foaming in the column. The aqueous reflux stream can, if desired, be returned to the reboiler section of the stripping column to avoid this undesirable dilution effect; however, the single stripping stage thus afforded results in less complete stripping of the soap as well as in lower chemicals recovery. The aforesaid water layer or aqueous reflux stream also can be stripped separately in an additional stripper to recover the chemicals. Obviously, however, this method is undesirable because of the cost of additional equipment.

A further disadvantage of processes previously employed to remove chemicals from their hydrocarbon solutions by the use of salt solutions of the aforesaid type resided in the fact that the chemical fraction obtained as a distillate from the stripping operation had a relatively high hydrocarbon content. In an effort to reduce the quantity of hydrocarbons present in the chemicals at this stage of the separation process, a deoiling step was introduced prior to the stripping operation in which the chemically rich salt extract solution was countercurrently extracted with a suitable light hydrocarbon such as, for example, butane or pentane, for the purpose of removing from said extract the majority, if not all, of the hydrocarbon impurities dissolved therein. While this procedure aided in substantially reducing the hydrocarbon content of the chemical fraction recovered, the foaming problem encountered in the stripping operation remained just as serious as before.

Accordingly, it is an object of my invention to provide a method for recovering oil-soluble nonacid oxygenated organic chemicals from hydrocarbon solutions thereof by the use of salt solutions of the type contemplated herein under conditions such that the deoiling step previously referred to may be either completely eliminated or employed only on a very substantially reduced scale as compared with procedures formerly used. It is a further object of my invention to provide a process by which the foaming phenomenon previously mentioned is substantially prevented. A further object of my invention is to provide a method for effecting stripping of a mixture having volatile and nonvolatile components wherein the heat requirements of such method are not greater than about 50 to 60 percent of those necessary in the case of procedures employing steam stripping of said mixture at the same vapor velocity.

Briefly the process of my invention involves introducing into a stripping column a chemically rich salt stream of the type obtained by the extraction of a hydrocarbon solution of oil-soluble nonacid chemicals with a suitable salt solution, the latter consisting essentially of an alkali metal salt of an aliphatic carboxylic acid, preferably having from about five to about twelve carbon atoms. At or near the bottom of the stripping column an inert gas is introduced having a latent heat of vaporization less than that of water, preferably about 50 percent less than the latent heat of vaporization of water. Thus, under such conditions, it is possible, at temperatures below the boiling point of the soap solution, to remove, as distillate, all of the chemicals and hydrocarbon contaminants in the salt solution together with an aqueous azeotrope of chemicals and/or hydrocarbons, the water present in the azeotrope representing the entire quantity of water passing overhead. Because of the relatively small concentration of water within the upper half of the stripping column, very little, if any, forming is encountered. The stripper is operated under pressures of from about 25 to about 100 p. s. i. g., preferably at about 50 p. s. i. g., and for a given temperature the partial pressure of the inert gas can be arbitrarily fixed by establishing the pressure in the presence of said inert gas. Thus, at atmospheric pressure and at a temperature below the boiling point of a 40 weight percent carboxylic acid solution of the aforesaid type, for example, 220° F., the introduction of the inert gas at the bottom of the column as a stripping agent causes the chemicals in the aqueous salt extract to be removed from the liquid bottoms together with azeotropic water. On the other hand, when such salt solutions are stripped at higher temperatures by boiling water out of the salt solution, the vapor velocities within the column are dependent on the rate at which the water is vaporized. However, when a suitable inert gas such as, for example, propane or butane, is injected into the salt solution in the manner indicated above, substantially any vapor velocity can be achieved. Because the latent heat of vaporization per mol of butane, for example, is about one-half that of water per mol, it requires less heat to attain a given vapor velocity with butane, or a similar inert gas, or a mixture of suitable inert gases, than when water vapor alone is present in the solution being stripped. Accordingly, it will be apparent that the conditions used in operating the stripping column may vary rather widely and that it is possible to carry out my invention merely by adding the inert gas in the proper amounts to a conventional stripping system. While maximum vapor velocities are secured at the boiling point of the mixture by stripping, and although the process of my invention can be employed under such conditions, I ordinarily prefer to effect the aforesaid stripping operation at temperatures ranging from about 10° to about 50° F. below the boiling point of the mixture for optimum efficiency, and preferably from about 20° to about 35° F. below that boiling point. In this connection the aqueous solution which are stripped in accordance with my invention may boil up to from about 240° to about 250° F.; however, in stripping the salt solutions generally worked with, the concentration of salt therein rarely runs in excess of about 40 weight percent. These solutions boil in the vicinity of from about 225° to about 230° F. at atmospheric pressure.

For a given mixture to be stripped, the inert gas should be added in amounts such that it constitutes from about 25 to about 75 volume percent of the total vapor component in the stripping column, and preferably from about 45 to about 55 volume percent thereof. Higher concentrations of inert gas in the vapor component result in relatively inefficient stripping conditions. The rate at which inert gas may be introduced at the bottom of the stripper varies widely. However, in general, it should not exceed from about 60 to 80 percent of the stripping column's flooding velocity. Usually from about 30 to about 50 percent of the flooding velocity of the column is an adequate rate at which the inert gas may be introduced into the system.

The gases which I may employ constitute a wide variety of materials, their chief requirements being that their latent heat of vaporization is substantially below that of water and that they do not react with any of the components of the system. For example, I may employ in the salt solutions being stripped, gases such as nitrogen, natural gas, propane, $C_4$ hydrocarbons such as, for example, isobutane, butane, butylene, isopentane, etc.; and the expression "inert gas" as employed in the present description and claims is to be construed as referring only to normally gaseous substances having the above-mentioned properties.

The process of my invention is further illustrated in the following flow diagram in which condensed hydrocarbon synthesis products in line 2 flow into separator 4 where the primary water stream is withdrawn for further processing outside the scope of my invention through line 6. The upper oil layer is taken off through line 8 and introduced into neutralizer or mixing vessel 10. The acids contained in the raw oil are thereafter neutralized by the addition of caustic, preferably in the form of a 10 to 15 weight percent aqueous solution, through line 12 after which the neutral oil layer containing the nonacid oil-soluble chemicals is withdrawn through line 14 and countercurrently contacted in exterior 16, preferably with an aqueous solution containing from about 30 to about 40 weight percent of an alkali metal salt of an aliphatic carboxylic acid having from five to twelve carbon atoms added to the extractor through line 18. Suitable solutions of such salts are obtained by neutralization of the free acids in hydrocarbon synthesis oil with an alkali metal compound, ammonia, or a substitute ammonium, recovering the corresponding salts thereof and thereafter diluting with water to the desired concentration. The ratio of salt to oil and the concentration of the salt solution employed in extractor 16 may vary within a relatively wide range depending on the nature and purity of the product desired. Thus, while the more concentrated salt solutions tend to extract the greatest amount of nonacid chemicals, the chemicals extracted by such solutions are rather heavily contaminated with hydrocarbons; whereas, the relatively dilute salt solutions tend only to remove a portion of the total chemicals present, but the hydrocarbon contamination of the chemicals thus obtained is comparatively low. Volume ratios of salt solutions to oil, which I generally prefer to employ, may range from about 1:1 to about 3:1.

Hydrocarbon raffinate from extractor 16 is withdrawn through line 20 and subjected to further refining operations outside the scope of this invention. The rich salt extract is withdrawn from the bottom of extractor 16 through line 22, combined with the solution of neutralized acids in line 24, and sent to stripper 26. During operation of the stripper, a lean salt stream is recycled to extractor 16 through line 178 while a net salt make is withdrawn from the system through line 30. Butane vapor under a pressure of 50 to 100 p. s. i. g. (approximately equivalent to the pressure in stripper 26) is heated in preheater 34 to a temperature of about 225° F. and thereafter introduced through line 32 and make-up line 35 into the salt extract contained in the bottom of stripper 26. The butane vapor serves to entrain or carry overhead large quantities of chemicals together with hydrocarbons and azeotropic water, even when the salt extract rich in chemicals is from about 20° to about 35° F. below its boiling point. Overhead a stream is withdrawn through line 36 and condenser 38 which consists essentially of hydrocarbons and oil-soluble chemicals together with azeotropic water. This stream is introduced into separator 40 and allowed to stratify into an upper organic layer and a lower aqueous phase. The latter is recycled to an intermediate point in the stripper via line 42 so that more efficient stripping of oil-soluble chemicals from the water may be effected. The organic layer is withdrawn through line 44 and sent to butane recovery column 46. In this column, which is also operated under pressure, for example, of from 40 to about 70 p. s. i. g. and at a bottoms temperature of from about 240° to about 250° F., butane is recovered overhead through line 32, condenser 48 and returned to stripper 26 via preheater 34, as previously described. A portion of the overhead in line 32 is returned to column 46 through line 47 as reflux, preferably in a 1:1 ratio. The bottoms fraction, which consists chiefly of oil-soluble nonacid chemicals together with hydrocarbon contaminants, is taken through line 50 to topping column 52 operated at about 40 to about 60 p. s. i. g. and at a bottoms temperature of from about 300° to about 325° F. The feed introduced into column 52 is preferably topped at 212° to 220° F., the overhead being withdrawn through line 54 and condenser 56, and a portion thereof returned to the column via line 58 as reflux. The overhead from column 52 contains light hydrocarbons which may be sent through line 60 to further refining. The bottoms from column 52, which is withdrawn through line 62, consists of chemicals plus heavy hydrocarbon contaminants. The latter may be removed from the chemicals by adding the stream in line 62 to a small deoiling unit 64. In the operation of this unit, liquid butane at a pressure of 100 p. s. i. g. is added through line 66, and make-up butane is introduced into the system through line 68. Within deoiler 64, which is maintained at a temperature of about 80° F., the stream of upwardly flowing butane contacts a countercurrent stream of chemicals and heavy hydrocarbons. Under the stated conditions, the hydrocarbons are separated from the chemicals and removed from the unit through line 70 and sent to fractionator 72, operated under conditions similar to those employed in column 46, where butane is recovered and recycled to the deoiling unit via compressor 75 and lines 74 and 66. The heavy hydrocarbon residue is withdrawn as bottoms through line 76 and sent to further refining. The bottoms fraction from deoiler 64 is sent through line 78 to butane flash tank 80, operated at a pressure of about 50 p. s. i. g. and at a bottoms temperature of about 240° F. which is sufficient to recover all the butane. The overhead is taken off through line 82, condenser 84, and the uncondensed portion removed from separator 86 and returned to butane line 66. Condensate from separator 86 is returned to flash tank 80 via line 88 while substantially hydrocarbon-free chemicals are removed from the system through line 90.

An alternative method for recovering hydrocarbons from the stream of chemicals in line 62 comprises returning said stream via line 92 to an intermediate point in extractor 16, preferably about midway thereof, where the presence of the chemicals-rich stream tends to cause the hydrocarbons dissolved in the aqueous salt extract to break out from that phase and to dissolve in the rising oil phase. This procedure may be regarded as a displacement of the solubilized hydrocarbons in the salt extract by the chemicals introduced into the system through line 92 under the conditions thus prevailing in extractor 16. By the introduction of the aforesaid chemicals stream, the hydrocarbon contaminants present in said stream tend to be forced into the oil phase, thereby materially reducing the quantity of hydrocarbon present in the net chemical make stream withdrawn from the system through line 94.

It will be obvious to those skilled in the art to which the present invention relates that numerous modifications in manipulative steps may be made without departing from the scope thereof. In general, it may be said that my invention contemplates the recovery of one or more volatile components from a liquid mixture thereof, containing one or more nonvolatile components, by subjecting said mixture to a stripping operation and during said operation injecting an inert gas into said mixture. Such stripping operation may be conducted at temperatures ranging from the boiling point thereof down to about 50° F. below the boiling point of said mixture. By the use of the processes of my invention for the recovery of dissolved volatile components from various extraction media containing nonvolatile components, it is possible to obtain a higher stripping efficiency with substantially lower heating costs than is possible to achieve by the use of existing methods.

I claim:
1. In a process for the recovery of nonacid oil-soluble oxygenated organic chemicals present in the liquid hydrocarbon fraction produced by the hydrogenation of carbon monoxide in the presence of an alkali promoted fluidized iron catalyst under known synthesis conditions whereby said fraction is subjected to extraction in an extraction tower with an aqueous solution of an alkali metal salt of an aliphatic carboxylic acid having from five to twelve carbon atoms to obtain an aqueous extract rich in said chemicals and containing as contaminants solubilized hydrocarbons from said liquid hydrocarbon fraction and recovering said chemicals from said extract by subjecting the latter to a stripping operation in a fractionating column, the steps which comprise injecting a hydrocarbon having from 3 to 5 carbon atoms into said solution while conducting said operation at a temperature ranging from the boiling point thereof down to about 50° F. below the boiling point of said mixture, recovering overhead said oil-soluble nonacid oxygenated organic chemicals and said hydrocarbon, and condensing the resulting overhead consisting essentially of said chemicals, azeotropic water, and said hydrocarbon.

2. The process of claim 1 in which said stripping operation is conducted at a temperature below the boiling point of the salt solution, but not less than about 50° F. below said boiling point.

3. The process of claim 1 in which a $C_4$ hydrocarbon is employed as the stripping gas and the stripping operation is conducted at a temperature ranging from about 20° to about 35° F. below the boiling point of the salt solution.

4. The process of claim 1 in which the aqueous salt solution employed contains from about 20 to about 40 weight percent of an alkali metal salt of an aliphatic carboxylic acid having from five to twelve carbon atoms.

5. The process of claim 1 in which the hydrocarbon is injected at a rate not substantially in excess of from about 60 to 80 percent of the flooding velocity of said column.

6. In a process for the recovery of nonacid oil-soluble oxygenated organic chemicals present in the liquid hydrocarbon fraction produced by the hydrogenation of carbon monoxide in the presence of an alkali promoted fluidized iron catalyst under known synthesis conditions whereby said fraction is subjected to extraction in an extraction tower with an aqueous solution of an alkali metal salt of an aliphatic carboxylic acid having from five to twelve carbon atoms to obtain an aqueous extract rich in said chemicals and containing as contaminants solubilized hydrocarbons from said liquid hydrocarbon fraction and recovering said chemicals from said extract by subjecting the latter to a stripping operation in a fractionating column, the steps which comprise injecting a hydrocarbon having from 3 to 5 carbon atoms into said extract at a rate not substantially in excess of from about 60 to 80 percent of the flooding velocity of said column at a temperature ranging from the boiling point of said extract down to about 50° F. below the boiling point thereof, recovering overhead said hydrocarbon and an aqueous fraction consisting essentially of said chemicals and solubilized hydrocarbons, condensing the resulting overhead and allowing said aqueous fraction to stratify into two layers, topping the upper organic layer in a fractionating column up to a temperature of from about 212° to about 220° F. to obtain overhead a fraction rich in low-boiling hydrocarbons, returning the bottoms fraction from said topping operation which consists chiefly of said chemicals and heavy hydrocarbon contaminants to an intermediate point in said extraction tower whereby said chemicals tend to pass into said aqueous alkali metal salt solution and said heavy hydrocarbon contaminants tend to pass into the resulting raffinate phase of said liquid hydrocarbon fraction, and repeating the above cycle whereby a net chemical make stream of substantially reduced hydrocarbon content is subsequently withdrawn as a bottoms fraction from the fractionating tower in said topping operation.

7. The process of claim 6 in which a $C_4$ hydrocarbon is employed as the stripping gas and the stripping operation is effected at a temperature below the boiling point of said extract, but not less than about 50° F. below said boiling point.

References Cited in the file of this patent

UNITED STATES PATENTS

| | | |
|---|---|---|
| 2,056,984 | Schellmann et al. | Oct. 13, 1936 |
| 2,079,652 | Davis et al. | May 11, 1937 |
| 2,161,798 | Carter | June 13, 1939 |
| 2,381,658 | Fessler | Aug. 7, 1945 |
| 2,452,797 | Smith | Nov. 2, 1948 |
| 2,535,069 | Johnson | Dec. 26, 1950 |
| 2,566,311 | Burton et al. | Sept. 4, 1951 |

OTHER REFERENCES

"Distillation," vol. 4 of Technique of Organic Chemistry, edited by Weisburger, published 1951 by Interscience Publ., Inc.